Patented May 23, 1933

1,910,005

UNITED STATES PATENT OFFICE

ARMAND DE WAELE, OF OLD SOUTHGATE, LONDON, ENGLAND, ASSIGNOR TO D. GESTETNER, LIMITED, OF LONDON, ENGLAND

VULCANIZED OR SULPHURIZED OIL COMPOSITION

No Drawing. Application filed September 12, 1927, Serial No. 219,177, and in Great Britain November 3, 1926.

This invention relates to vulcanized or sulphurized oil compositions.

The behavior of oils with respect to vulcanizing agents such as sulphur chloride depends not only upon the proportion of esters of unsaturated fatty acids present in the oil but also upon the degree of unsaturation of the fatty acids of which esters are present and also upon the existence in the oils of esters of oxy fatty acids.

Briefly it may be stated that the velocity of the reaction between sulphur chloride or equivalent vulcanizing agents and esters of unsaturated fatty acids is low in the case of esters of such non-hydroxy fatty acids as contain only one double bond, while in the case of esters of fatty acids the molecule of which contains more than one double bond, for instance esters of linolic and linolenic acid, it is high and it is also high in the case of esters of hydroxy fatty acids such as ricinoleic acid and the oxy fatty acids produced by "blowing" oils.

In consequence of the variation not only in the character of the esters of unsaturated fatty acids in oils but in their content of such esters the behavior of oils when subjected to the action of sulphur chloride varies considerably and the products obtained exhibit widely varying properties. It may be stated generally that the oils yielding gels, which from the point of view of their mechanical strength possess desirable properties, are those between which and sulphur chloride the reaction is most energetic or violent and which are prone to produce spongy products owing to the formation of gaseous or vaporous products within the reaction mass.

The difficulties in the way of obtaining coherent masses of relatively mechanically strong vulcanized oil compositions, owing to the energetic character of the reaction between the vulcanizing agent and suitable oils, have been overcome in forming, for instance, printing rollers by introducing the mixture of oil and sulphur chloride into a mold which is rotated at high speed in order to force the composition against the wall of the mold which has been suitably treated to facilitate the separation or withdrawal of the molded mass. The rotation of the mold is resorted to in order that the air imprisoned in the composition or the gases and vapors formed by the reaction in the vulcanized oil mass may be separated and within the shell of vulcanized oil composition thus produced a further quantity of a similar composition is introduced.

A further means of overcoming the difficulties consequent upon the energetic character of the reaction resulting in the formation of gaseous or vaporous by-products involves the introduction of the mixture of oil and sulphur chloride into a substantially rigid or non-distensible mold so as completely to fill the same, the composition being subjected while in the mold to high pressure until the desired reactions have taken place or progressed sufficiently to form a relatively rigid gel.

The present invention is based on the observation that by using esters of the higher unsaturated fatty acids, in which one of the hydrogens of the fatty acid residue is substituted by an atom or group which is electro-negative but is less electro-negative than the hydroxyl group, the vulcanizing reaction when using an agent, such as sulphur chloride, is moderated or retarded while the products obtained may possess properties rendering them more suitable for use for a variety of technical purposes than the products obtained by similarly treating fatty oils.

The invention therefore consists in the production of elastic masses of the general character of vulcanized oil compositions which comprises subjecting an ester of an unsaturated higher fatty acid, in which one of the hydrogens of the fatty acid residue has been replaced by a substituent, namely, an atom or group which is electro-negative but which is less electro-negative than the hydroxyl group, to the action of a vulcanizing agent, for example sulphur chloride, sulphur thiocyanate, dithiocyanogen and the like.

The invention consists more particularly in subjecting esters of the higher oxy or hydroxy unsaturated fatty acids, in which the hydrogen of the hydroxyl group is substituted by an acyl group, to the action of a vulcanizing agent.

While there are a large number of esters of fatty acids falling within the classes above specified, relatively few of them will be of interest or be available for the production of commercial products. Thus the capacity of many of the bodies falling within these classes to produce vulcanized products is more of theoretical than of practical interest.

Further, the esters in question will not normally be employed in their pure state but in admixture with esters of other fatty acids as in order to obtain the esters which are used in accordance with the invention it will normally be preferable to employ naturally-occurring or commercial products which consist of glycerine esters of hydroxy fatty acids in association with glycerine esters of saturated fatty acids or non-hydroxy unsaturated fatty acids.

As examples of materials for use in the production of the esters employed in accordance with the invention castor oil and oxidized or blown oils may be referred to.

The choice of the electro-negative atom or group substituting a hydrogen of the fatty acid residue is also limited largely by consideration of cost. Thus normally in accordance with the invention the choice of the substituent atom or group will be restricted to chlorine or the acetyl, formyl or carbonate group.

Highly satisfactory results have been obtained in accordance with the invention by the use of acetylated castor oil and acetylated blown oils.

When using acetylated castor oil the oil alone or in admixture with other oils is brought together with the vulcanizing agent, for instance sulphur chloride, and the mixture introduced into a mold or the like in order that the reaction between the vulcanizing agent and the acetylated oil may proceed.

The reaction is relatively slow and thus the introduction of the material into the mold can be effected without difficulty whereas when using castor oil itself together with sulphur chloride the reaction is so rapid and violent that difficulty is experienced in filling the reaction mixture into the mold. This difficulty may be of little importance when producing granular or spongy products adapted to be subsequently worked up with rubber or other resins, further quantities of oil or the like, but when attempting to produce coherent masses, such for instance as printing rollers, the high velocity of the reaction between sulphur chloride and oils containing considerable proportions of esters of unsaturated oxy fatty acids or of esters of highly unsaturated fatty acids gives rise to very great difficulties.

Where necessary or desirable additions of oils, fats or waxes adapted to react with the vulcanizing agents used or fillers, diluents, accelerators or retarding agents may be made to or associated with esters of the character specified. Further, the control or regulation of the conditions as to temperature and the like under which the reaction is allowed to progress may be resorted to.

In some cases, in accordance with the invention, it may be desirable to take steps either to prevent the formation of bubbles in the reaction mass or to eliminate the gaseous or vaporous products formed and for this purpose the reaction mass may be subjected to centrifugal action in rotating moulds or the material may be introduced into a substantially rigid or non-distensible mold so as completely to fill the same and the reaction allowed to proceed therein under high pressure. In other words, the procedure in forming such coherent masses may follow the known procedure referred to in a preceding portion of this specification.

In conclusion it is to be observed that the above description is furnished for the purpose of indicating the nature of the invention and of describing by way of example suitable manners of carrying the same into effect and consequently many changes and modifications as well as variations in the character of the initial materials may be made without exceeding the scope of the present application.

Having now described my invention what I claim as new and desire to secure by Letters Patent is:—

1. The process of producing coherent elastic bodies which comprises subjecting to the action of sulphur chloride acetylated castor oil.

2. Coherent elastic masses resembling rubber comprising cold vulcanized acetylated castor oil.

3. Coherent elastic masses resembling rubber comprising sulphur chloride vulcanized acetylated castor oil.

4. Coherent elastic masses of a rubber-like character comprising the cold vulcanized product of an oily material containing an ester of a higher hydroxy unsaturated acid of the fatty series in which one of the hydrogen atoms of the fatty acid have been replaced by a substituent material selected from a group including the element chlorine, or the acetyl, formyl or carbonate groups.

5. The process of producing elastic masses of the general character of vulcanized oil compositions which comprises subjecting, to the action of sulphur chloride, an oily material containing an ester of a higher hydroxy unsaturated acid of the fatty series in which one of the hydrogen atoms of the fatty acid have been replaced by a substituent material selected from a group including the element chlorine, or the acetyl, formyl or carbonate groups.

In testimony whereof I have signed my name to this specification.

ARMAND DE WAELE.